(12) United States Patent
Bouvet et al.

(10) Patent No.: US 10,075,497 B2
(45) Date of Patent: Sep. 11, 2018

(54) METHOD AND DEVICE FOR CONTROLLING THE USE OF A DATA STREAM OF A COMMUNICATION

(71) Applicant: ORANGE, Paris (FR)

(72) Inventors: Bertrand Bouvet, Perros-Guirec (FR); Catherine Salou, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/784,574

(22) PCT Filed: Apr. 17, 2014

(86) PCT No.: PCT/FR2014/050935
§ 371 (c)(1),
(2) Date: Oct. 14, 2015

(87) PCT Pub. No.: WO2014/177788
PCT Pub. Date: Nov. 6, 2014

(65) Prior Publication Data
US 2016/0072867 A1 Mar. 10, 2016

(30) Foreign Application Priority Data
May 3, 2013 (FR) ...................................... 13 54097

(51) Int. Cl.
*H04W 76/11* (2018.01)
*H04L 29/06* (2006.01)

(52) U.S. Cl.
CPC .......... *H04L 65/601* (2013.01); *H04L 63/102* (2013.01); *H04L 65/1006* (2013.01); *H04L 65/1069* (2013.01); *H04L 65/1096* (2013.01); *H04W 76/11* (2018.02)

(58) Field of Classification Search
CPC . H04L 65/601; H04L 65/1096; H04L 63/102; H04L 65/1006; H04L 65/1069; H04W 76/021; G06F 15/16; G06F 3/00
See application file for complete search history.

(56) References Cited

U.S. PATENT DOCUMENTS

2010/0185956 A1* 7/2010 Anantharaman ..... H04L 65/403
715/753
2012/0278864 A1* 11/2012 Dugeon .............. H04L 12/2834
726/4

FOREIGN PATENT DOCUMENTS

EP  2 175 607 A1  4/2010

OTHER PUBLICATIONS

The Written Opinion for the PCT/FR2014/050935 application.
The International Search Report for the PCT/FR2014/050935 application.

* cited by examiner

*Primary Examiner* — Chuong A Ngo
(74) *Attorney, Agent, or Firm* — Haverstock & Owens LLP (57) ABSTRACT

The invention relates to a method for controlling the use of a data stream transmitted during a communication established between at least a transmitting device and a destination terminal. During a phase for negotiation of the parameters of the data stream of the communication, the method comprises a step of determining at least one rule for the use of the data stream of the communication and a step of inserting the at least one determined use rule into a message for negotiation of the parameters of the data stream of the communication, said message being intended to be transmitted to the destination terminal. The invention also relates to a corresponding device using said method.

12 Claims, 3 Drawing Sheets

FIG 2

METHOD AND DEVICE FOR CONTROLLING THE USE OF A DATA STREAM OF A COMMUNICATION

The invention relates to the field of protection of multimedia content.

The invention concerns the protection of content of audio, image or video type that is transmitted by a piece of equipment of terminal or server type when the equipment is communicating with a recipient terminal.

The invention notably concerns the protection of multimedia content that is intended to be transmitted by a user during communication by the latter with an interlocutor. When a user is communicating with an interlocutor, the user has no means of controlling what his interlocutor will do with the content of the communication. The interlocutor can record the audio/videostream of the communication without his knowing and can then modify it or transmit it to other interlocutors.

The invention likewise concerns the protection of multimedia content transmitted by a server communicating with a recipient terminal, for example for the transmission of a multimedia content in streaming mode. Transmission of a multimedia content in streaming mode, which is well known to a person skilled in the art, is progressive transmission of the multimedia content to the recipient terminal. By way of example, for a content of video type, the images of the video are received and reproduced by the recipient terminal as time progresses in the video. The multimedia content is transmitted in a plurality of packets, and these packets, following reproduction on the recipient terminal, may or may not be saved on the recipient terminal.

Techniques for protecting content of DRM (for Digital Rights Management, in English) type are used by content providers in order to protect and give certain rights to users concerning artistic works. These techniques use a license system that a user needs to acquire in order to have access to a content. When the content is downloaded, the terminal needs to check with a license server whether the user has effectively acquired the rights to the content.

These techniques are not adapted to the protection of content that is generated and transmitted in the course of communication between at least two interlocutors. This is because, prior to access to the content by one of the interlocutors, the interlocutor needs to acquire rights to the content. The content must therefore already exist and be referenced by the license server.

Moreover, these techniques are complex to implement because they require the implementation of a license server in order to manage the rights to a content and to check that a user is authorized to access the content.

One of the aims of the invention is to make improvements in relation to the aforementioned prior art.

To this end, the invention proposes a method for controlling the use of a data stream transmitted during a communication that is set up between at least one transmitter device and a recipient terminal. In the course of a negotiation phase for the parameters of the data stream of the communication, the method comprises a step of determination of at least one rule for use of the data stream of the communication and a step of insertion of the at least one determined rule for use into a negotiation message for the parameters of the data stream of the communication, the message being intended to be transmitted to the recipient terminal.

Correlatively, the invention concerns a device for controlling the use of a data stream that is transmitted during a communication that is set up between at least the device and a recipient terminal. The device comprises means for determining at least one rule for use of the data stream of the communication and means for inserting at least one determined rule for use into a negotiation message for the parameters of the data stream of the communication, the message being intended to be transmitted to the recipient terminal, said determination and insertion means being intended to be activated in the course of negotiation of the parameters of the data stream of the communication.

Thus, a user of the transmitter device can simply and automatically control the use that a recipient terminal can make of the data streams interchanged during the communication between the transmitter device and the recipient terminal. Such interchanges of data streams can take place, by way of example, in the case of telephone or videophone communication. In this case, the transmitter device corresponds to a terminal of the user. According to another example, when the transmitter device is a server broadcasting a multimedia content to the recipient terminal in streaming mode, the method according to the invention allows simple provision of management rights for the multimedia content that is broadcast to the recipient terminal. In this example, the data stream of the communication corresponds to the multimedia content broadcast in streaming mode. The method according to the invention does not need to store management rights for the multimedia content on the recipient terminal or on a server associated with an identifier of the recipient terminal.

The invention concerns the protection of data streams relating to any type of real-time communication session such as telephone, videophone, instant messaging, audio conferencing, videoconferencing, whiteboarding, audio or videostreaming, etc., communications.

The invention is notably aimed at the protection of the media data interchanged in the course of communication between a transmitter device and a recipient terminal, for example the audio, video, text and image data of the communication. The invention allows independent protection of each data stream of a communication. By way of example, for a videophone communication, the audio data stream and the video data stream can be protected according to distinct rules for use.

The rules for use of the data stream are, by way of example, actions performed in the course of the communication, on the received data stream, such as reading of the stream or local or external recording of the stream. The rules for use are likewise, by way of example, actions performed on the stored data of the received stream, such as modification, sharing or transfer.

The various embodiments or implementation features mentioned below can be added independently or in combination with one another to the steps of the method defined above.

The various embodiments or implementation features mentioned below can be added independently or in combination with one another to the features of the device defined above.

According to a particular embodiment of the invention, the rule for use is determined according to the recipient terminal or the user of the recipient terminal.

Thus, various rules for use of the data stream can be defined according to the recipients of the communication. These rules for use can be determined automatically by associating predefined rules with certain recipients according to predetermined criteria: history of the communication with the recipient, link to the recipient, type of recipient terminal, type of communication with the recipient, localization of the recipient terminal, type of connectivity of the recipient terminal (WiFi, 3G, etc.) etc.

By way of example, if the telephone number of the recipient terminal is present in the address book associated with the transmitter device, the rules for use of reading and recording of the data streams can be determined. By contrast, if the telephone number of the recipient terminal is not present in the address book associated with the transmitter device, only the rule for use of reading limited to the duration of the communication in progress is determined.

The rules for use can also be determined manually by the user of the transmitter device by associating, by way of example, preferences with certain recipients recorded in the address book associated with the transmitter device.

According to another particular embodiment of the invention, the rule for use is determined according to an address or an access network used by the recipient terminal in order to reach the transmitter device so as to set up the communication.

Thus, various rules for use of the data stream can be defined according to the telecommunication network used for setting up the communication between the transmitter device and the recipient terminal.

According to another particular embodiment, various rules for use of the data stream can be defined according to the address used by the recipient terminal in order to reach the transmitter device so as to set up the communication between the transmitter device and the recipient terminal. By way of example, the address can correspond to a telephone number on which the transmitter device can be reached.

When the transmitter device is a server, the server can implement various types of services such as audio or video content streaming, voice or video message streaming, etc.

Depending on the number used by the recipient terminal to reach the server, various tariffs linked to the services can be applied by the telecommunications operator or the service provider. Various rules for use can then be associated with these numbers according to the applied tariff.

According to another particular embodiment of the invention, the method for controlling the use of a data stream transmitted during a communication comprises the insertion of at least one parameter associated with the rule for use into the negotiation message for the parameters of the data stream of the communication.

Thus, it is possible to configure the rules for use of the data stream of the communication. By way of example, if the rule for use corresponds to the recording of the data stream of the communication, a parameter associated with the rule for use can correspond to an authorized location for the storage of the recorded data stream. This location may be an internal memory of the recipient terminal, or a memory that is external to the recipient terminal and connected to a connection port of the recipient terminal or via a telecommunication network.

According to another example, if the rule for use corresponds to sharing of the data stream of the communication, the rule for use is associated with a list of at least one identifier of another terminal or of a user of another terminal that is authorized to access the recorded data stream.

The invention likewise concerns a method for communication between at least one transmitter device and a recipient terminal. The method for communication comprises a negotiation phase for the parameters of a data stream of the communication, in the course of which a negotiation message for the parameters of the data stream is received from the transmitter device, and a step of extraction, from the received negotiation message for the parameters of the data stream, of at least one rule for use of the data stream of the communication. The method of communication moreover comprises, during a phase of communication between the transmitter device and the recipient terminal, a step of processing of the data stream of the communication according to the extracted rule for use.

Correlatively, the invention also concerns a device for communication between at least one transmitter device and a recipient terminal, comprising means for extracting at least one rule for use of the data stream of the communication from a negotiation message for the parameters of a data stream of the communication, which message is received from the transmitter device, said extraction means being intended to be activated in the course of negotiation of the parameters of the data stream of the communication between the transmitter device and the recipient terminal, and means for processing the data stream of the communication according to the extracted rule for use, said processing means being intended to be activated in the course of communication between the transmitter device and the recipient terminal.

Thus, the data stream received from the transmitter device is protected vis-à-vis use that the user can make of the recipient terminal. Only the actions authorized by the rules for use can be performed by the recipient terminal.

The various embodiments or implementation features mentioned below can be added independently or in combination with one another to the steps of the method for communication that is defined above.

The various embodiments or implementation features mentioned below can be added independently or in combination with one another to the features of the communication device that is defined above.

According to a particular embodiment of the invention, the method for communication comprises, according to the extracted rule for use, a step of recording of the received data stream and a step of insertion of an identifier relating to the transmitter device or to the user of the transmitter device into a file containing the recorded data stream.

Thus, when the recipient terminal is authorized to record the received data stream, the transmitter device or the user of the transmitter device for the data stream that has been received and recorded can be identified.

According to another particular embodiment of the invention, the method for communication comprises, according to a first extracted rule for use, a step of recording of the received data stream and, according to a second extracted rule for use, a step of insertion of an identifier relating to a terminal that is authorized or to the user of a terminal that is authorized to access the recorded data stream into a file containing the recorded data stream.

Thus, when the recipient terminal is authorized to record the received data stream, access by other terminals or by users of other terminals to the data stream that has been recorded is controlled by the parameters of the second rule for use that the transmitter device has positioned in the communication session negotiation message.

The invention also concerns a terminal comprising a device for controlling the use of a data stream transmitted during a communication that is set up between at least one transmitter device and a recipient terminal, according to any one of the particular embodiments of the invention that is described above.

The invention also concerns a terminal comprising a communication device according to any one of the particular embodiments of the invention that are described above.

The invention also concerns a negotiation message for parameters of a data stream transmitted during a communication between at least one transmitter device and a recipient terminal for the message. The message comprises at least one rule for use of the data stream of the communication.

The various embodiments or implementation features mentioned below can be added independently or in combination with one another to the features of the message that is defined above.

According to a particular embodiment of the invention, the message comprises at least one identifier relating to the transmitter device or to the user of the transmitter device.

According to another particular embodiment of the invention, the message moreover comprises at least one identifier relating to a terminal that is authorized or to the user of a terminal that is authorized to access the data stream of the communication when said stream has been recorded by the recipient terminal.

In a particular embodiment, the various steps of the method for controlling the use of a data stream transmitted during a communication that is set up between at least one transmitter device and a recipient terminal and the various steps of the method for communication are determined by computer program instructions.

Consequently, the invention is also aimed at computer programs on an information storage medium, these programs each being capable of being implemented in a terminal or more generally in a computer, these programs each having instructions that are adapted to implementation of the various steps of the methods that have just been described.

These programs can use any programming language and be in the form of source code, object code or an intermediate code between source code and object code, such as in partially compiled form, or in any other desirable form.

The invention is also aimed at an information storage medium that can be read by a computer and having instructions from a computer program as mentioned above.

The information storage medium may be any entity or device that is capable of storing the program. By way of example, the medium may have a storage means, such as a ROM, for example a CD-ROM or a microelectronic circuit ROM, or else a magnetic recording means, for example a USB key or a hard disk.

Moreover, the information storage medium may be a transmissible medium such as an electrical or optical signal, which can be forwarded via an electrical or optical cable, by radio or by other means. The program according to the invention may in particular be downloaded to a network of Internet type.

Alternatively, the information storage medium may be an integrated circuit that incorporates the program, the circuit being adapted to executing or to being used in the execution of the methods in question.

Other advantages and features of the invention will emerge more clearly on reading the description that follows for a particular embodiment of the invention, which is provided by way of simple illustrative and nonlimiting example, and the appended drawings, among which.

Figure 1:
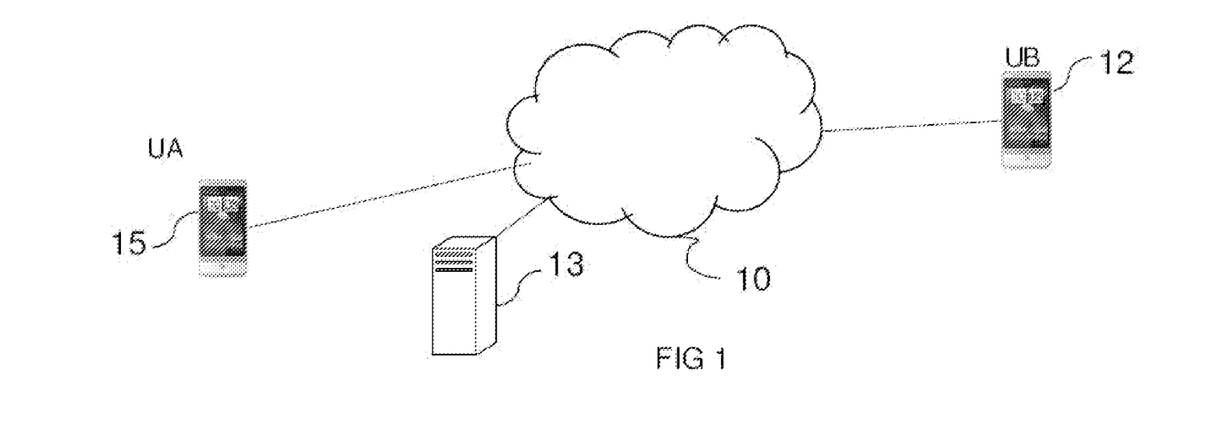
FIG. 1 illustrates an implementation environment for a particular embodiment of the invention.

FIG. 1 illustrates an implementation environment for a particular embodiment of the invention. The environment comprises a telecommunication network 10 to which two terminals 12 and 15 and a server 13 are connected. The terminals 12 and 15 may be any type of terminals allowing setup of telephone or videophone communication, such as a cellphone, a smartphone (in English), a tablet, a television connected to a telecommunication network, a personal computer on which a telephony application, also called a softphone, is installed.

By way of example, the telecommunication network 10 can correspond to an IP (for Internet Protocol in English) network or a mobile telecommunication network of GSM, EDGE, 3G, 3G+, etc., type. The communication network 10 shown may correspond to a group of communication networks of different operators that are interconnected, allowing data to be interchanged and communications to be set up between terminals connected to the communication network 10 by means of access points (not shown) to the communication network.

In the particular embodiment of the invention that is described here, a user UA of the terminal 15 wishes to communicate with a user UB of the terminal 12. The communication between the terminals 12 and 15 is set up via an IMS (Internet Multimedia Subsystem in English) network, for example using the SIP (Session Initiation Protocol in English) communication protocol.

The method for controlling the use of a data stream transmitted during the communication that is set up between the terminal 15 and the terminal 12 is implemented during the negotiation phase for the parameters of the communication, before the communication between the terminals is set up. The method can be implemented symmetrically on each of the terminals 12 and 15 or on a single one of the terminals. When it is implemented on the terminal 12, or 15, the method for controlling the use of a data stream transmitted during the communication allows control of the use that the terminal 15, or 12, can make of the data stream transmitted by the terminal 12, or 15, in the course of the communication.

The method for communication according to a particular embodiment of the invention is likewise implemented during the negotiation phase for the parameters of the communication, and in the course of the communication between the terminals 12 and 15. The method for communication can be implemented symmetrically on each of the terminals 15 and 12 or on a single one of the terminals. When it is implemented by the terminal 15, or 12, the method for communication allows the terminal 15 or 12, to perform processing on the data stream transmitted by the terminal 12, or 15, in the course of the communication according to the authorizations that the terminal 12, or 15, will have determined during the negotiation phase.

According to another particular embodiment of the invention, the server 13 connected to the telecommunication network 10 is a server of a communication service provider. By way of example, the server 13 is adapted to implementing a multimedia content broadcast service, such as audio or video content streaming, or a voice or video messaging service.

The broadcast of multimedia content may be a broadcast of image content, of voice messages or of the synthesized text messages.

In the particular embodiment of the invention that is described here, the user UA of the terminal 15 requests setup of communication with the server 13 so as to access a service provided by the server 13. The request for setup of communication that is transmitted by the terminal 15 is identical to a communication request that is transmitted to a terminal. The communication between the terminal 15 and the server 13 is set up via an IMS (Internet Multimedia Subsystem in English) network, using the SIP (Session Initiation Protocol in English) communication protocol, for example.

The method for controlling the use of a data stream transmitted during the communication that is setup between the terminal 15 and the server 13 is implemented during the negotiation phase for the parameters of the communication, before the communication is set up between the terminal 15 and the server 13. In this particular embodiment of the invention, the method for controlling the use of a data stream transmitted during the communication is implemented by the server 13. The method for controlling the use of a data stream transmitted during the communication allows control of the use that the terminal 15 can make of the data stream transmitted by the server 13, in the course of the communication.

The method for communication according to this particular embodiment of the invention is likewise implemented during the negotiation phase for the parameters of the communication, and in the course of the communication between the terminal 15 and the server 13. The method for communication is implemented by the terminal 15. The method for communication allows the terminal 15 to perform processing on the data stream transmitted by the server 13 in the course of the communication according to the authorizations that the server 13 will have determined during the negotiation phase.

Figure 2:
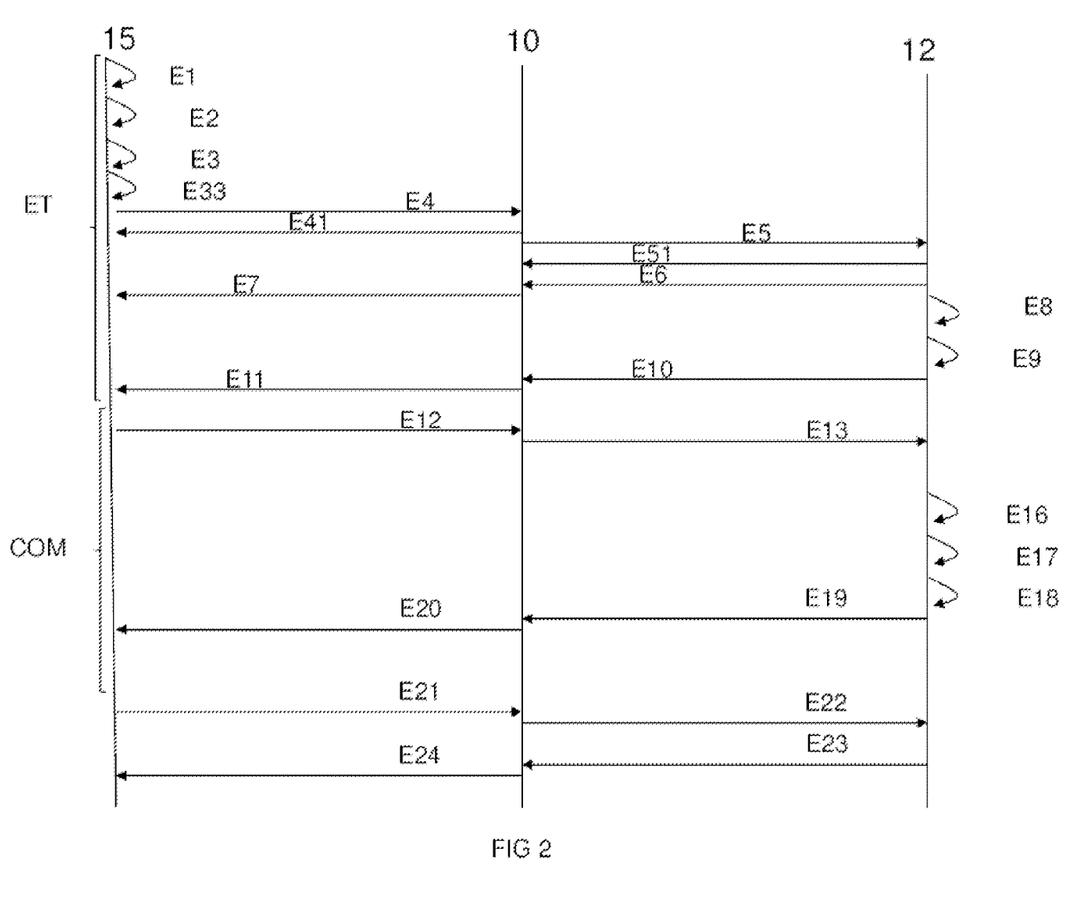
FIG. 2 shows a timing diagram detailing the steps of the method for controlling a communication data stream implemented by a transmitter device and the corresponding steps of the method for communication that is implemented by a receiver terminal according to a particular embodiment of the invention.

FIG. 2 shows a timing diagram detailing the steps of the method for controlling a communication data stream implemented by a transmitter device and the corresponding steps of the method for communication that is implemented by a receiver terminal according to a particular embodiment of the invention.

In order to set up communication, for example of video type, with the terminal 12, during a step E1, the user UA of the terminal 15 selects the corresponding application on his terminal 15 and dials the telephone number of the terminal 12 or selects the user UB from a list of contacts that is accessible to his terminal 15, for example in his address book.

In a step E2, the terminal 15 determines at least one rule for use of the audio data stream and at least one rule for use of the video data stream, said audio and video data streams corresponding to the streams of the communication that are going to be transmitted by the terminal 15 when the communication between the terminal 12 and the terminal 15 is set up.

A rule for use of a data stream corresponds to processing that the recipient terminal, in this case the terminal 12, can perform on said data stream. The processing operations performed on the data stream can correspond, by way of example, to:

recording of the data stream in a file that can be saved either in a local memory of the terminal 12 or on a recording medium that is connected to the terminal 12, such as a hard disk, a USB key or a memory card.

reading of the saved file containing the data stream. This processing can be accompanied by a parameter for the number of times that the recipient terminal can perform this processing: once, N times or an unlimited number of times.

sharing of the saved file containing the data stream on a social network, an Internet site or by a telephony application.

transmission of the saved file to other recipients. This processing can be accompanied by an identifier of the applications that are authorized to perform this transmission, for example a piece of electronic messaging software, a telephony application or communication protocols.

When the saved file is shared or the saved file is transmitted to other recipients, the rule for use can be accompanied by a list of identifiers of recipients that are authorized to have access to the saved file. A recipient may be either a user or a terminal, or else a service domain name.

According to a particular embodiment of the invention, the rules for use are determined manually by the user UA of the terminal 15 prior to the communication request to the terminal 12.

According to another particular embodiment of the invention, the rules for use are determined automatically at the time of the communication request to the terminal 12 according to a predetermined criterion. By way of example, the user UA can define rules for use according to a history of communication with his interlocutor. If the user UA is accustomed to communicating with the user UB or if the user UB is shown as a trusted person in the address book of the user UA, rules for use such as recording, unlimited reading of the recorded file or sharing of the recorded file will be determined. By contrast, if the user UA communicates with the user UB for the first time, only the rule for use to read the stream in the course of the communication will be determined.

A predetermined criterion for determining a rule for use may also correspond to the type of communication that is set up with the interlocutor. By way of example, the user UA can define that text communications can be recorded by the recipient terminal and that, during video communications, only the audio data streams can be recorded but that the audio data streams can be neither shared nor transmitted and that the video data streams cannot be recorded.

As a variant, a predetermined criterion for determining a rule for use may also correspond to the type of terminal of the user UB. By way of example, if the user UB can be in contact with the same telephone number on various possible terminals, the user UA can select that when the user UB uses his personal terminal of cellphone or smartphone type in order to communicate, local recording of the data stream is authorized. When the user UB uses a collective terminal such as a smart TV or a computer in order to communicate, however, recording of the data stream of the communication is not authorized.

In this variant, the terminal 15 does not know what type of terminal will be used for communicating before the user UB responds to the call request. A default rule for use can then be determined, for example not allowing recording, and then the rule for use is updated upon reception of the response from the user UB to the call request according to the type of terminal that the user UB uses.

The rules for use have previously been stored in a memory that is accessible to the terminal 15: either in an internal memory of the terminal or in a storage space of the network. According to a particular embodiment of the invention, the rules for use can be stored in association with the contacts of the address book of the user UA.

According to another particular embodiment of the invention, the rules for use can be stored with the parameters of the telephony application that define the communication preferences of the user UA.

In order to determine a rule for use of a data stream of the communication, the terminal 15 looks for the rules for use that are stored in the communication preferences of the user UA. The terminal 15 examines whether the telephone number dialed by the user UA is present in the address book of the user UA, and, if this is the case, the terminal 15 checks whether specific rules for use are associated with this telephone number. The rules for use that have been determined beforehand according to the communication preferences are updated if need be.

According to a particular embodiment of the invention, in the step of determination of at least one rule for use, the terminal 15 determines at least one parameter associated with a rule for use. By way of example, for a rule for use corresponding to the recording of the data stream, an associated parameter may be the storage location of the file containing the recorded data stream. This location may be a memory space of the recipient terminal or a remote memory space that is situated in the network or in a piece of peripheral equipment for the terminal such as a USB key or an external hard disk, for example.

According to another example, for a rule for use corresponding to the sharing or transmission of the data stream to other recipients, a parameter associated with the rule for use is a list of user identifiers, terminals or recipient services for the file containing the recorded data stream. A user identifier may be an email address, a telephone number or a SIP URI (for Session Initiation Protocol Uniform Resource Identifier in English) address. An identifier for a terminal may be an international identification number for a terminal (for example NEI), an address for a network interface card of a terminal or a serial number of a terminal. An identifier for a service may be an address for an Internet site (URL for Uniform Resource Locator in English), an IP (for Internet Protocol in English) address or a domain name.

Following determination of the rules for use and possibly the associated parameters according to step E2, the terminal 15 inserts, in a step E3, the rules for use into a negotiation message for the parameters of the data stream of the communication.

In the course of a negotiation phase ET that is shown in FIG. 2, a negotiation message for the parameters of the communication is conventionally interchanged between terminals prior to the setup of a communication session. By way of example, for communications using the SIP protocol, SDP (for Session Description Protocol in English) messages are interchanged between the terminals. An SDP message contains the media capabilities of the transmitter terminal for the SDP message and the connection parameters of the transmitter terminal for the SDP message that are necessary for setting up the communication between the transmitter terminal for the SDP message and a recipient terminal. The media capabilities correspond to the codecs supported by the transmitter terminal, for example for the audiostream: G711, G729, G722, etc., for the videostream: H263. H264, etc. The connection parameters are notably the transport protocol (for example UDP for User Datagram Protocol in English, TCP for Transmission Control Protocol in English), and the IP addresses and IP ports for connecting the transmitter terminal for the SDP message that allow the transmitter terminal for the SDP message to receive the media data streams of the recipient terminal in the course of the communication.

By way of example, if the terminal 15 supports:
audio codecs: G722 as priority 1, G.711A as priority 2 or G.729A as priority 3,
DTMF events according to RFC4733 transport mode,
the H263 video codec,
an SDP message transmitted by the terminal 15 to the terminal 12 notably comprises the following parameters:
"m=audio 2000 RTP/AVP 9 8 18 101
a=rtpmap:9 G722/16000
a=rtpmap:8 PCMA/8000
a=rtpmap:18 G729/8000
a=rtpmap:101 telephone-event/8000
a=fmtp:101 0-11
a=ptime:20
m=video 2002 RTP/AVP 34
a=rtpmap:34 H263/90000".

By sending the SDP message during the phase of setup of the communication, the terminal 15 informs the terminal 12 of its capabilities. The line beginning "m" indicates the data stream in question: audio, video. The subsequent lines beginning "a" indicate the attributes or parameters of the data stream in the order of priority that are defined by the terminal 15.

In step E3, the terminal 15 inserts the determined rules for use for each data stream of the communication into the SDP message. The insertion is made by adding a piece of information relating to a possible rule for use of the data stream, followed by a parameter indicating whether or not use is authorized, to the attributes of a data stream, on a line beginning "a".

By way of example, the SDP message contains the following information relating to the audio data stream:
"a=:read:yes", this line authorizes the terminal 12 to read the audio data stream, in real time, in the course of the communication,
"a=:record-local:yes", this line authorizes the terminal 12 to record the audio data stream in a file in a local memory of the terminal 12,
"a=:record-peripheral:no", this line does not authorize the terminal 12 to record the audio data stream in a file on an external peripheral,
"a=:record-cloud:no", this line does not authorize the terminal 12 to record the audio data stream in a file on the network,
"a=share:no", this line does not authorize sharing of the audio data stream with other recipients.

According to another particular embodiment of the invention, the ("yes/no") parameter indicating whether or not use is authorized can be omitted. The presence of the information relating to a rule for use of the data stream in the SDP message signifies that use is authorized.

According to another particular embodiment of the invention, the terminal 15 inserts at least one complementary parameter associated with the rule for use into the SDP message in a step E33. For a rule for use that relates to the recording of the data stream, a complementary parameter may correspond to the authorized location for storing the file containing the data stream.

For a rule for use that relates to the sharing or to the transfer of the file to other recipients, a complementary parameter corresponds to a list of identifiers for recipients that are authorized to read the data stream contained in the file. Such a recipient may be a user, a terminal or a service.

In this particular embodiment of the invention, the SDP message contains the following information, for example:

"a=share: http://www.socialnetwork.com; dom.com", this line authorizes sharing of the data stream in question on the Internet site "socialnetwork" and on the navigation domain dom.com".

According to another particular embodiment of the invention, the terminal 15 can insert a piece of information relating to the user UA or to the terminal 15 into the SDP message. This information is intended to be inserted into the file containing the data stream when the data stream is recorded by the terminal 12 if recording is authorized by the terminal 15. In this particular embodiment of the invention, the SDP message contains the following information, for example:

"a=owner:+33296053xxx;+33686xxxxxx; prenomUA.nomUA@dom.com".

This line provides information about the owner or creator, in this case the user UA, of the data stream contained in the file saved by the terminal 12.

The SDP message is encapsulated in an SIP INVITE message. The SIP INVITE message is then sent by the terminal 15 to the terminal 12 by means of the IMS network 10 in a step E4. The SIP INVITE message sent by the terminal 15 corresponds to a request for setup of communication with the terminal 12.

In response to the SIP INVITE message from the terminal 15, the network 10 sends an SIP 100 TRYING message to the terminal 15 in a step E41.

The network 10 then transmits the SIP INVITE message transmitted by the terminal 15 to the terminal 12 in a step E5. The terminal 12 responds by sending an SIP 100 TRYING message to the network 10 in a step E51.

Following reception of the communication setup request from the terminal 15, the terminal 12 triggers ringing in order to warn the user UB of the request from the user UA. The terminal 12 then sends an SIP 180 RINGING message to the terminal 15 by means of the network 10, in a step E6. The network 10 then transmits the SIP 180 RINGING message to the terminal 15 in a step E7.

Following reception of the SIP INVITE message transmitted in step E5, in the course of a step E8, the terminal 12 extracts the rules for use that have been inserted into the SDP message of the SIP INVITE message transmitted by the terminal 15. The terminal 12 then positions the corresponding authorizations for each type of data stream in the communication application used for the communication to be set up, according to the "yes/no" parameters associated with the rules for use. When there is no information relating to a rule for use for a data stream present in the SDP message, the terminal 12 determines that the processing of the data stream according to this rule for use is not authorized. As a variant, when there is no information relating to a rule for use for a data stream present in the SDP message, the terminal 12 determines that the processing of the data stream according to this rule for use is authorized, or at least for the reading rule for use.

When the user UB decides to pick up the call request, in a step E9, the terminal 12 determines the rules for use that relate to the data streams of the communication to be set up and inserts a piece of information relating to said determined rules for use into an SDP message.

In this example, if the terminal 12 supports:
audio codecs: G711 as priority 1, G.729A as priority 2,
DTMF events according to the RFC4733 mode of transport, and if the terminal 12 authorizes the reading and local recording of the audio data stream, an SDP message generated and transmitted by the terminal 12 to the terminal 15 notably comprises the following parameters:

"m=audio 4000 RTP/AVP 8 18 101
a=rtpmap:8 PCMA/8000
a=rtpmap:18 G729/8000
a=rtpmap:101 telephone-event/8000
a=fmtp:101 0-11
a=ptime:20
a=:read:yes
a=:record-local:yes
m=video 0 RTP/AVP 34".

In a step E10, the terminal 12 transmits an SIP 200 OK message, comprising notably the previously generated SDP message, to the terminal 15. In a step E11, the network 10 transmits the SIP 200 OK message to the terminal 15.

Following reception of the SIP 200 OK message by the terminal 15, the terminal 15 transmits an SIP ACK acknowledgement message (not shown in FIG. 2) to the terminal 12. The terminal 15 likewise extracts the rules for use inserted by the terminal 12 into the SDP message transmitted in step E10 and positions the corresponding authorizations for each type of data stream in the communication application used for the communication to be set up.

The communication between the terminal 15 and the terminal 12 can then be set up by using the communication parameters interchanged in the SDP messages.

In this example, following interchange of the SDP messages in the negotiation phase ET, the terminals 15 and 12 use the PCMA (G.711A) audio codec because it is in the order of preference of the terminals that is indicated in the respective SDP message that they are transmitted, the first audio codec that is common to the two terminals. The terminals 15 and 12 will likewise be able to use the interchange of DTMF (for Dual Tone Module Frequency in English) according to the RFC4733 mode. The video cannot be used between the terminals 15 and 12 since the terminal 12 refuses to use the video by positioning the port=0 between the video word and RTP in the line m=video 0 RTP/AVP 34. The terminal 15 will be able to record the audio data stream received from the terminal 12 because the terminal 12 has inserted this authorization into the SDP message that the terminal 12 has transmitted, through the line "a=:record-local:yes". Equally, the terminal 12 will be able to record the audio data stream received from the terminal 15 because the terminal 15 has inserted this authorization into the SDP message that the terminal 15 has transmitted.

In the communication phase (COM in FIG. 2), the terminals 15 and 12 interchange data streams. By way of example, in a step E12, the terminal 15 transmits an audio data stream to the terminal 12 by means of the network 10 in step E13. In a step E19, the terminal 12 likewise transmits an audio data stream to the terminal 15 by means of the network 10 in step E20.

By way of example, the user UB of the terminal 12 wishes to record the audio data stream of the communication in progress. To that end, the telephony interface used for the communication displays to the user UB the possible processing operations for each data stream of the communication. The user UB then selects the recording option on his terminal 12, for example using a menu of the telephony interface. As the "record-local" rule for use is authorized, the terminal 12 triggers, in a step E16, recording of the audio data stream received from the terminal 15 in the course of the communication, in a saved file that is stored in an internal memory of the terminal 12.

As a variant, the terminal 12 likewise records the audio data stream transmitted by the terminal 12 in the course of the communication in the same file.

According to a particular embodiment of the invention, in a step E17, the terminal 12 inserts at least one identifier relating to the user UA or to the terminal 15 into the file containing the recorded audio data stream. The identifier to be inserted into the file is an identifier that has been inserted on an "owner" attribute line relating to the audio data stream in the SDP message transmitted by the terminal 15, in the setup phase for the communication session.

According to another particular embodiment of the invention, in a step E18, the terminal 12 inserts at least one identifier relating to a user or to a terminal that is authorized to read the content of the recorded file into the file containing the recorded audio data stream. By way of example, the identifier to be inserted into the file is an identifier that has been inserted on the "share" attribute line relating to the audio data stream in the SDP message transmitted by the terminal 15, during the setup phase for the communication session. At the end of the communication, when the user UA terminates the call, in step 21, the terminal 15 sends an SIP BYE message to the terminal 12 in order to bring an end to the communication. The network 10 extends the SIP BYE message to the terminal 12 in step E22. The terminal 12 responds with an SIP 200 OK message in step E23. The network 10 extends the SIP 200 OK message to the terminal 15 in step E24.

According to a particular embodiment of the invention, the terminal 15 may not have authorized recording of the data stream by the terminal 12, during the setup phase for the communication. By way of example, the recording rule for use is positioned at the value "no" or omitted from the SDP message sent by the terminal 15. In the course of the communication, when the user UB of the terminal 12 wishes to record the audio data stream of the communication, he orally asks his correspondent to provide him with the recording rights. If the user UA agrees, he selects in his communication application the menu allowing modification of the rules for use of the communication streams in progress. The list of streams being interchanged is then displayed on the screen of the terminal 15. In the example described here, a single audio stream is displayed. A drop-down list of rules for use that are associated with the audio stream is likewise displayed on the screen of the terminal 15. If the user UA selects one or more rules for use that are different than the rules for use previously negotiated during the call setup phase, then the terminal 15 sends to the terminal 12 an SIP Re-INVITE (or SIP UPDATE) message containing an SDP message containing the new rules for use that have been chosen by the user UA. The terminal 12 responds with an SIP 200 OK message having the same SDP message as the one that the terminal 12 had transmitted during the call setup phase, since the terminal 12 does not modify the rules for use that were positioned for the terminal 15. In response, the terminal 15 sends an SIP ACK acknowledgement message.

According to another particular embodiment of the invention, when the user UB of the terminal 12 wishes to record the audio data stream of the communication, he selects the "recording" menu of his communication application. As the recording rule for use is not authorized for the terminal 12, the terminal 12 sends a text message to the terminal 15, for example by using an SIP MESSAGE message with the following text: "Your interlocutor requests authorization to record the communication in progress". Thus, the terminal 12 asks the user UA for authorization to record the audio data stream of the communication.

The text message received by the terminal 15 is then displayed on the screen of the terminal 15 and receives an automatic response with an SIP 200 OK message sent to the terminal 12.

If the user UA wishes to authorize the terminal 12 to record the audio data stream, he uses the interface of the communication application to modify the rules for use of the communication as described in the embodiment described above using a phase of SIP Re-INVITE or SIP UPDATE renegotiation message interchange.

On reception of the new SDP message received during the renegotiation phase for the parameters and sent by the terminal 15, the terminal 12 updates the corresponding authorizations in its communication application and starts recording of the audio data stream of the communication.

Figure 3:
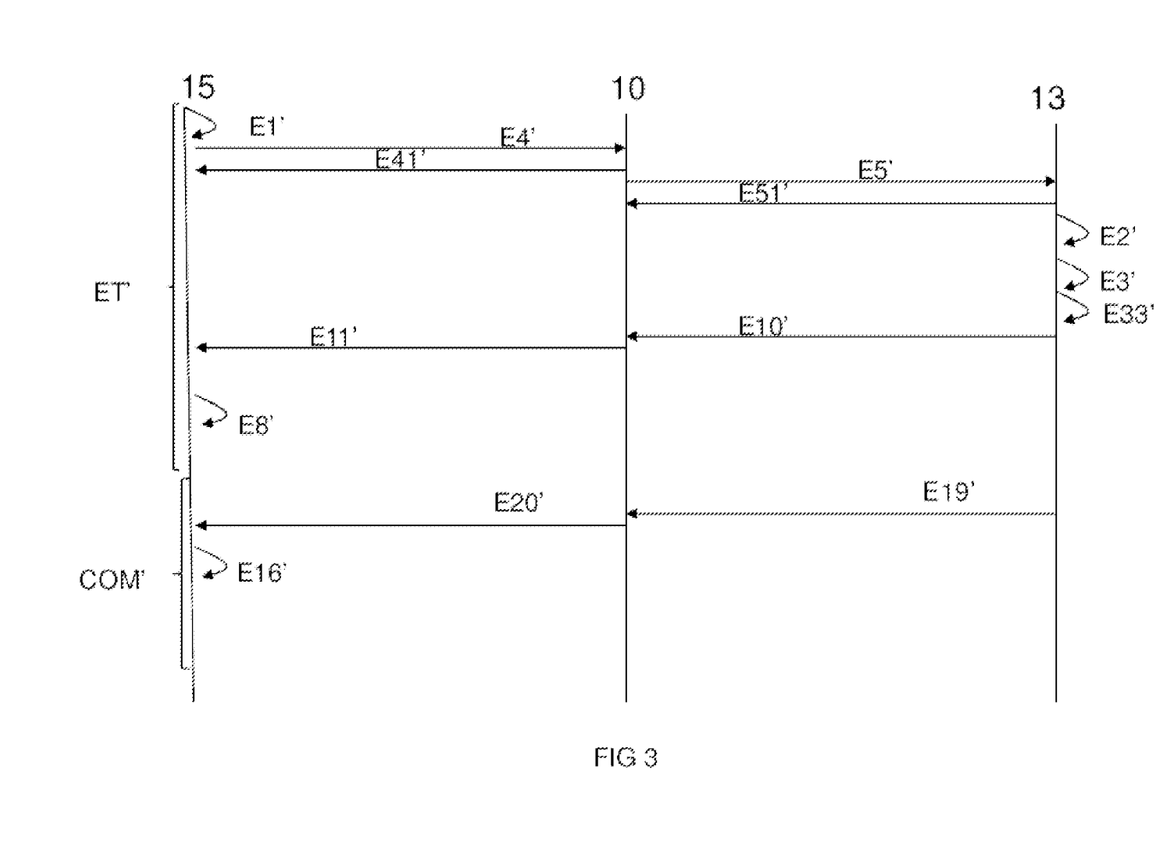
FIG. 3 shows a timing diagram detailing the steps of the method for controlling a communication data stream implemented by a transmitter device and the corresponding steps of the method for communication that is implemented by a receiver terminal according to another particular embodiment of the invention.

FIG. 3 shows a timing diagram detailing the steps of the method for controlling a communication data stream implemented by a transmitter device and the corresponding steps of the method for communication that is implemented by a receiver terminal according to another particular embodiment of the invention.

In the particular embodiment of the invention that is described here, in step E1', the user UA of the terminal 15 requests setup of communication with the server 13 in order to access a service provided by the server 13. The communication setup request transmitted by the terminal 15 is identical to a communication request transmitted to a terminal 12 as described with reference to FIG. 2. By way of example, the communication between the terminal 15 and the server 13 is set up via an IMS (Internet Multimedia Subsystem in English) network, according to the SIP (Session Initiation Protocol in English) communication protocol using steps E4', E5', E41' and E51' that are implemented in the course of the negotiation phase ET' and correspond to steps E4, E5, E41 and E51, respectively, described with reference to FIG. 2.

In a step E2', the server 13 determines at least one rule for use of the audio data stream and at least one rule for use of the video data stream, said audio and video data streams corresponding to the streams of the communication that are transmitted by the server 13 in order to respond to the service request transmitted via the terminal 15.

According to a particular embodiment of the invention, the server 13 determines a rule for use relating to a data stream according to a resource allowing the terminal 15 to access the server 13. Such an access resource may correspond to a telephone number, an IP address, a URL or an application installed on the terminal 15.

By way of example, the server 13 determines that the terminal 15 can record the audio and video data streams that the server will transmit to the terminal 15. In a step E3', the server 13 inserts the "record-local=yes" rule for use into the SDP message on an attribute line relating to the audio data stream and on an attribute line relating to the video data stream.

In a step E10', the server 13 transmits to the terminal 15 an SIP 200 OK message comprising notably the SDP message generated previously. In a step E11', the network 10 transmits the SIP 200 OK message to the terminal 15.

Following reception of the SIP 200 OK message in step E11', in the course of a step E8', the terminal 15 extracts the rules for use that have been inserted into the SDP message of the SIP 200 OK message transmitted by the server 13. The terminal 15 then positions the corresponding authorizations for each type of data stream in the communication application used for accessing the server 13, according to the "yes/no" parameters associated with the rules for use.

In the communication phase COM', the server 13 transmits an audio data stream and a video data stream to the terminal 15 in a step E19' by means of the network 10, which transmits said data streams to the terminal 15 in step E20'.

The user UA of the terminal 15 wishes to record the audio and video data streams of the communication in progress. To that end, the interface of the communication application that is used for accessing the server 13 displays to the user UA the possible processing operations for each data stream of the communication. The user UA then selects the recording option on his terminal 15, for example via a menu of the communication interface. As the "record-local" rule for use is authorized, the terminal 15 triggers, in a step E16', the recording of the audio data stream and of the video data stream that have been received from the server 13 in the course of the communication, in a saved file stored in an internal memory of the terminal 15.

Figure 4:
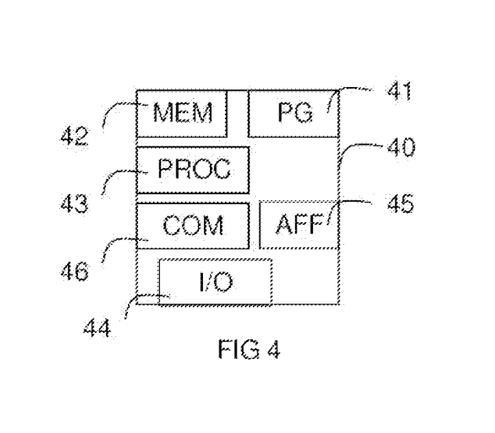
FIG. 4 illustrates a device allowing implementation of the method for controlling a data stream of a communication according to a particular embodiment of the invention.

FIG. 4 illustrates a device 40 allowing implementation of the method for controlling a data stream for communication according to a particular embodiment of the invention. The device comprises a storage space 42, for example a memory (MEM), and a processing unit 43, for example equipped with a microprocessor (PROC), and controlled by the computer program (PG) 41, implementing the method for controlling a data stream for communication as described in the invention with reference to FIG. 2 or FIG. 3.

On initialization, the code instructions of the computer program 41 are loaded into memory, for example, before being executed by the processor of the processing unit 43. The microprocessor of the processing unit 43 implements the steps of the method for controlling a data stream transmitted during a communication that is set up between at least the device 40 and a recipient terminal. The microprocessor of the processing unit 43 notably implements, in the course of a negotiation phase for the parameters of the data stream of the communication, the steps of determination of at least one rule for use of the data stream of the communication, and of insertion of the at least one determined rule for use into a negotiation message for the parameters of the data stream of the communication, the message being intended to be transmitted to the recipient terminal, according to the instructions of the computer program 41.

The storage space 42 notably allows storage of the predetermined rules for use or of the communication preferences that will allow determination of the rules for use of a communication data stream.

According to a particular embodiment of the invention, the storage space 42 also allows storage of a contact address book of a user of the device 40.

According to another particular embodiment of the invention, the storage space 42 allows storage of a file containing a multimedia data stream intended to be transmitted in the course of the communication between the device 40 and the recipient terminal, for example when the device 40 corresponds to the server 13 described with reference to FIGS. 1 and 3.

According to a particular embodiment of the invention, the device likewise comprises a user interface 44 (I/O) allowing the user to interact with the device 40. By way of example, this user interface may correspond to a keyboard, a mouse or a touchscreen.

According to a particular embodiment of the invention, the device likewise comprises a display means 45 (AFF) allowing, by way of example, windows for interaction with a software application executed by the device to be displayed to the user of the device.

The device also has an access unit 46 (COM) for accessing a network allowing, by way of example, the device 40 to access the Internet or to set up communications via various communication networks, such as a mobile telephony network, a computer network or a satellite network.

According to a particular embodiment of the invention, the device 40 is included in a terminal such as a, fixed or mobile, personal computer, a cellphone, a tablet or a smart TV.

According to another particular embodiment of the invention, the device 40 is included in the server.

Figure 5:
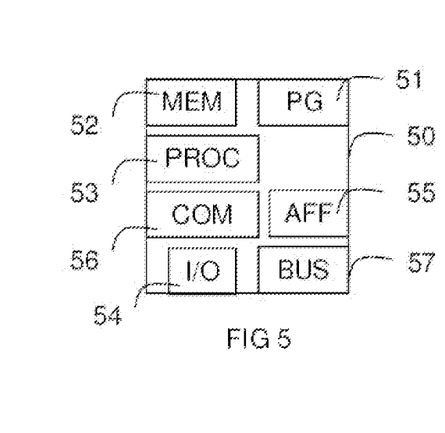
FIG. 5 illustrates a device allowing implementation of the method for communication according to a particular embodiment of the invention.

FIG. 5 illustrates a device 50 allowing implementation of the method for communication according to a particular embodiment of the invention.

The device comprises a storage space 52, for example a memory (MEM), and a processing unit 53, for example equipped with a microprocessor (PROC), and controlled by the computer program (PG) 51, implementing the method for communication as described in the invention with reference to FIGS. 2 and 3.

On initialization, the code instructions of the computer program 51 are loaded into memory, for example, before being executed by the processor of the processing unit 53. The microprocessor of the processing unit 53 implements the steps of the method for communication between at least one transmitter device and the device 50, and notably in the course of a negotiation phase for the parameters of a data stream of the communication, a step of reception of a negotiation message for the parameters of the data stream, from the transmitter device, and a step of extraction of at least one rule for use of the data stream of the communication, according to the instructions of the computer program 51, from the received negotiation message for the parameters of the data stream. Then, during a phase of communication between the transmitter device and the device 50, the microprocessor of the processing unit 53 implements a step of processing of the data stream of the communication according to the extracted rule for use, according to the instructions of the computer program 51.

The storage space 52 notably allows storage of the extracted rules for use.

According to a particular embodiment of the invention, the storage space 52 allows storage of a file containing the data streams of the communication when the data streams are recorded by the device 50.

According to another particular embodiment of the invention, the storage of the file containing the data streams of the communication when the data streams are recorded by the device 50 is carried out on an external storage space connected to the device 50 by a connecting port 57 (BUS). The connecting port 57 allows peripherals to be connected to the device 50, for example a hard disk or a USB key.

The device likewise comprises a user interface 54 (I/O) allowing the user to interact with the device 50. By way of example, this user interface may correspond to a keyboard, a mouse or a touchscreen.

According to another particular embodiment of the invention, the device likewise comprises a display means 55 (AFF), for example allowing a video data stream or windows for interaction with a software application executed by the device to be displayed to the user of the device.

The device also has an access unit 56 (COM) for a network, for example allowing the device 50 to access the Internet or to set up communications via various communication networks, such as a mobile telephony network, a computer network or a satellite network.

The device 50 is included in a terminal such as a, fixed or mobile, personal computer, a cellphone, a tablet or a smart TV.

The invention claimed is:

1. A method for protecting a data stream transmitted during a communication that is set up between at least one transmitter device (15, 13) and a recipient terminal (12, 15) against at least one unauthorized action performed on said data stream by said recipient terminal, wherein in the course of a negotiation phase for the parameters of the data stream of the communication, the method comprises:
a step of determination (E2) of at least one rule for authorizing the recipient terminal to perform an action on said data stream,
a step of insertion (E3) of the at least one determined rule for authorizing an action into a negotiation message for the parameters of the data stream of the communication, the message being intended to be transmitted to the recipient terminal (12, 15).

2. The method as claimed in claim 1, wherein the rule for authorizing an action is determined according to the recipient terminal or the user of the recipient terminal.

3. The method as claimed in claim 1, wherein the rule for authorizing an action is determined according to an address or an access network used by the recipient terminal in order to reach the transmitter device so as to set up the communication.

4. The method as claimed in claim 1, wherein the method comprises the insertion (E4) of at least one parameter associated with the rule for authorizing an action into the negotiation message for the parameters of the data stream of the communication.

5. A method for communication between at least one transmitter device (15, 13) and a recipient terminal (12), the method comprising a negotiation phase for the parameters of a data stream of the communication, in the course of which a negotiation message for the parameters of the data stream is received (E5) from the transmitter device, wherein the method comprises:
a step of extraction (E8), from said received negotiation message, of at least one rule for authorizing said recipient terminal to perform an action on said data stream of the communication,
during a phase of communication between the transmitter device and the recipient terminal, a step of performing an action on the data stream of the communication according to the extracted rule for authorizing an action.

6. The method for communication as claimed in claim 5, wherein the method comprises:
according to the extracted rule for authorizing an action, a step of performing an action of recording (E16) of the received data stream,
and a step of insertion (E17) of an identifier relating to the transmitter device or to the user of the transmitter device into a file containing the recorded data stream.

7. The method for communication as claimed in claim 5, wherein the method comprises:
according to a first extracted rule for authorizing an action, a step of performing an action of recording (E16) of the received data stream,
according to a second extracted rule for authorizing an action, a step of insertion (E18) of an identifier relating to a terminal that is authorized or to the user of a terminal that is authorized to access the recorded data stream into a file containing the recorded data stream.

8. A device for protecting a data stream transmitted during a communication that is set up between at least the device and a recipient terminal against at least one unauthorized action performed on said data stream by said recipient terminal, said device comprising:
a non-transmissible data medium comprising computer-readable instructions stored thereon; and
a processor configured by the instructions to perform:
determining at least one rule for authorizing the recipient terminal to perform an action on said data stream,
inserting at least one determined rule for authorizing an action into a negotiation message for the parameters of the data stream of the communication, the message being intended to be transmitted to the recipient terminal,
said determining and inserting being intended to be performed in the course of negotiation of the parameters of the data stream of the communication.

9. A device for communication between at least one transmitter device and a recipient terminal, said device comprising:
a non-transmissible data medium comprising computer-readable instructions stored thereon; and
a processor configured by the instructions to perform:
extracting at least one rule for authorizing said recipient terminal to perform an action on said data stream of the communication from a negotiation message for the parameters of a data stream of the communication, said negotiation message being received from the transmitter device, said extracting being intended to be performed in the course of negotiation of the parameters of the data stream of the communication between the transmitter device and the recipient terminal,
performing an action on the data stream of the communication according to the extracted rule for authorizing an action, said processing being intended to be performed in the course of communication between the transmitter device and the recipient terminal.

10. A terminal comprising a device for protecting a data stream transmitted during a communication that is set up between at least the device and a recipient terminal against at least one unauthorized action performed on said data stream by said recipient terminal, said device comprising:
a non-transmissible data medium comprising computer-readable instructions stored thereon; and
a processor configured by the instructions to perform:
determining at least one rule for authorizing said recipient terminal to perform an action on said data stream of the communication,
inserting at least one determined rule for authorizing an action into a negotiation message for the parameters of the data stream of the communication, the message being intended to be transmitted to the recipient terminal,
said determining and inserting being intended to be performed in the course of negotiation of the parameters of the data stream of the communication.

11. A server comprising a device for protecting a data stream transmitted during a communication that is set up between at least the device and a recipient terminal against at least one unauthorized action performed on said data stream by said recipient terminal, said device comprising:
a non-transmissible data medium comprising computer-readable instructions stored thereon; and a processor configured by the instructions to perform:
   determining at least one rule for authorizing the recipient terminal to perform an action on said data stream,
   inserting at least one determined rule for authorizing an action into a negotiation message for the parameters of the data stream of the communication, the message being intended to be transmitted to the recipient terminal,
said determining and inserting being intended to be performed in the course of negotiation of the parameters of the data stream of the communication.

12. A non-transmissible computer readable data medium storing a computer program having program code instructions for executing steps of a method, when the program is executed by a processor, the method for protecting a data stream transmitted during a communication that is set up between at least one transmitter device (15, 13) and a recipient terminal (12, 15) against at least one unauthorized action performed on said data stream by said recipient terminal, wherein in the course of a negotiation phase for the parameters of the data stream of the communication, the method comprises:
   a step of determination (E2) of at least one rule authorizing the recipient terminal to perform an action on said data stream,
   a step of insertion (E3) of the at least one determined rule for authorizing an action into a negotiation message for the parameters of the data stream of the communication, the message being intended to be transmitted to the recipient terminal (12, 15).

* * * * *